United States Patent [19]

D'Anna

[11] Patent Number: 4,493,612
[45] Date of Patent: Jan. 15, 1985

[54] AXIALLY SLIDEABLE PLENUM FOR CIRCULATION CONTROL AIRCRAFT

[75] Inventor: Frank P. D'Anna, Shelton, Conn.

[73] Assignee: United Technologies Corporation, Hartford, Conn.

[21] Appl. No.: 431,476

[22] Filed: Sep. 30, 1982

[51] Int. Cl.³ .............................................. B64C 27/18
[52] U.S. Cl. .............................. 416/20 R; 416/90 A
[58] Field of Search ................ 416/20 R, 20 A, 90 R, 416/90 A

[56] References Cited

U.S. PATENT DOCUMENTS

| | | | |
|---|---|---|---|
| 2,925,129 | 2/1960 | Yuan et al. | 416/90 A X |
| 3,132,696 | 5/1964 | Laufer | 416/20 A |
| 3,288,225 | 11/1966 | Flint et al. | 416/90 A X |
| 3,327,969 | 6/1967 | Head | 416/20 R X |
| 3,464,650 | 9/1969 | Girard | 416/90 A X |
| 3,524,711 | 8/1970 | Cheeseman et al. | 416/20 R |
| 3,525,577 | 8/1970 | Cheeseman | 416/90 A |
| 3,794,273 | 2/1974 | Girard | 416/20 R X |
| 3,990,811 | 11/1976 | Danielson | 416/20 R |
| 4,189,283 | 2/1980 | McCoubrey | 416/20 A |

FOREIGN PATENT DOCUMENTS 634332  3/1950  United Kingdom ............ 416/90 A Primary Examiner—Everette A. Powell, Jr.
Attorney, Agent, or Firm—Russell M. Lipes, Jr.

[57] ABSTRACT

Mechanical collective pitch control system for a circulation control rotor system aircraft utilizing an axially moveable pneumatic system plenum 32 in the collective pitch control system.

3 Claims, 2 Drawing Figures

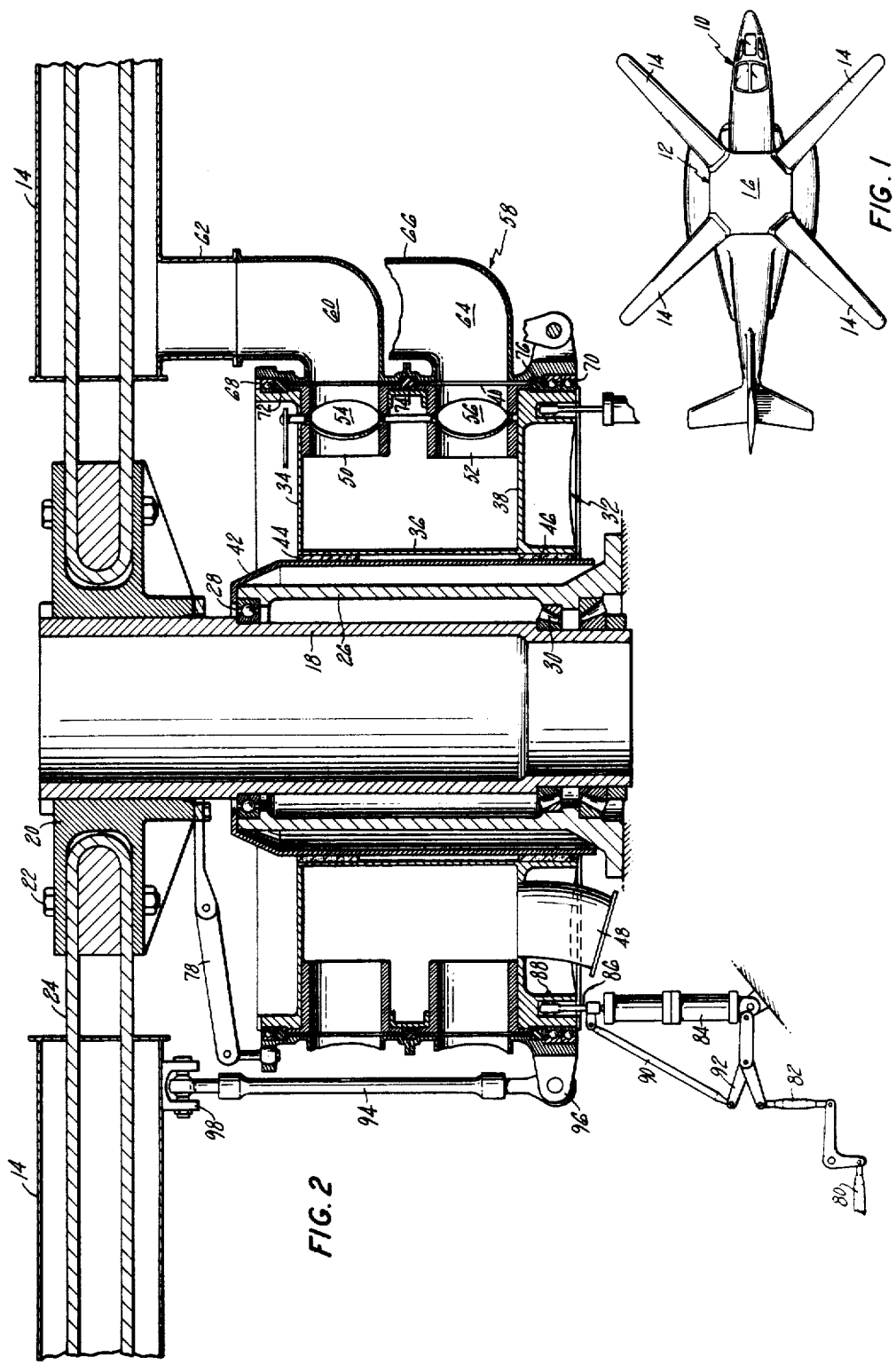

AXIALLY SLIDEABLE PLENUM FOR CIRCULATION CONTROL AIRCRAFT

The invention was conceived or first actually reduced to practice under Department of the Army contract No. MDA903-81-C-0281.

TECHNICAL FIELD

This invention relates to a mechanical collective pitch system for an aircraft utilizing a circulation control rotor system and more particularly to a plenum assembly which functions as an element of a pitch control system.

BACKGROUND ART

An X-wing aircraft uses a rigid rotor/wing utilizing circulation control airfoils. The rotor is driven mechanically and the rotor blades operate essentially in fixed pitch. Collective and cyclic lift control is basically achieved by control of air circulation about the blade airfoils. This is done by blowing compressed air through leading edge and trailing edge openings on the rotor blades, modulating the amount of air being ejected through the openings. A limited amount of collective pitch control, however, may be achieved through mechanical linkage.

The rotor system for an X-wing aircraft includes a hub and attached rotor blades and a pneumatic system for delivering compressed air separately to the leading edge and the trailing edge of the individual rotor blades at the desired pressure and mass flow. The pneumatic system includes an air storage chamber, or plenum, and it is the plenum and its relation to the mechanical pitch control system which is the subject of this invention.

A circulation control rotor system is described in the report titled "Circulation Control Rotor Flight Demonstrator" by David R. Barnes, Douglas G. Kirkpatrick and George A. McCoubrey presented at an American Helicopter Society Mideast Region Symposium in August, 1976. The report titled "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stresa, Italy, Sept. 13-15, 1978 describes an X-wing development program.

Davidson et al U.S. Pat. No. 3,139,936 and Flint et al U.S. Pat. Nos. 3,348,618 and 3,349,853 describe a control mechanism for a helicopter having circulation control with compressed air being supplied through the rotor pillar. Cheeseman et al U.S. Pat. No. 3,524,711 and Seed U.S. Pat. No. 3,567,332 describe helicopter rotors employing circulation control.

DISCLOSURE OF INVENTION

Performance and handling qualities analyses of the X-wing rotor have shown that a mechanical collective pitch control system is desirable to provide trim of the rotor during various flight regimes, specifically hover and high speed stopped rotor flight.

An object of the present invention is to provide a mechanical collective pitch system for an aircraft having a circulation control rotor system which does not involve linkage within the rotor shaft.

Another object of the invention is to provide a mechanical collective pitch system for a circulation control aircraft in which the plenum assembly in the pneumatic system functions as a movable element to provide a degree of collective pitch trim.

Still another object of the invention is the provision of a plenum chamber in the pneumatic system of a circulation control aircraft which is capable of limited axial motion as part of a mechanical collective pitch system.

The foregoing and other objects and advantages of the present invention may be seen by referring to the following description and claims, read in conjunction with the accompanying drawings.

BRIEF DESCRIPTION OF THE DRAWINGS

FIG. 1 is a top view of a circulation control aircraft of the X-wing type.

FIG. 2 is a schematic section through the rotor system hub area of the aircraft of FIG. 1 showing the pneumatic system plenum and collective pitch system linkage.

BEST MODE FOR CARRYING OUT THE INVENTION

The aircraft of FIG. 1 includes fuselage 10 on top of which is mounted rotor system 12 including four blades 14 and hub portion 16. Blades 14 are circulation control airfoils, each blade having leading edge and trailing edge slots through which compressed air from a pneumatic system is ejected. Control is obtained by cyclically and collectively modulating the amount of ejected airflow. In certain flight regimes such as landing and taking off, the rotor system rotates, and in other flight regimes such as forward flight the rotor system is stationary and is stopped and locked in the position shown in FIG. 1.

In FIG. 2 the hub portion of the bearingless rotor system and the area below it is shown schematically in some detail. Rotor drive shaft 18 is connected at hub cuff 20 by bolts 22 to flexbeams 24 which are connected at their outer ends to the rotor blades. These elements are the basic rotating structure. Stationary support shaft 26 surrounds drive shaft 18 and bearings 28 at the top end of the stationary shaft and bearings 30 at the lower end of the stationary shaft provide for relative rotational movement. The stationary shaft in addition to supporting the drive shaft provides the support for a surrounding compressed air storage chamber, plenum 32, which is located under and as near as possible to the plane of rotation of the rotor blades.

Plenum 32 includes top annular wall 34, interior circumferential wall 36, lower annular wall 38, and outer circumferential wall 40 as the principal elements of an annular nonrotating chamber. The plenum is mounted on guide 42 which is attached to stationary shaft 26, and is spaced from the guide by journal bearings 44 and 46 which provide for limited axial motion of the plenum with respect to the guide and the stationary shaft. Compressed air is supplied to the plenum through inlet 48. Outer circumferential wall 40 includes about its periphery a number of ports 50 and 52 in which are located individually operable valves 54 and 56, respectively, for controlling the flow of air from the plenum to a rotating chamber 58 surrounding the plenum.

Rotating chamber 58 includes receiver 60 which receives air from ports 50 for conduction through duct 62 to the leading edge slot of a rotor blade 14, and receiver 64 which receives air from ports 52 for conduction through duct 66 to the trailing edge slot of the rotor blade. Similar ducts are provided for each rotor blade. Bearings 68 and 70 provide for the rotational movement between the plenum and the rotating chamber, and air seals 72, 74 and 76 prevent the leakage of air between the plenum and the rotating chamber. Scissors 78 connects hub cuff 20 and rotating chamber 58 so that chamber 58 is rotated with the rotor shaft and rotor blades.

The mechanical collective pitch system as illustrated for one blade 14 includes control input 80 connected by linkage 82 to hydraulic actuator 84, the lower end of which is attached to stationary aircraft structure. Rod 86 extends upward from the actuator to a connection 88 with lower annular wall 38 of plenum 32. Feedback link 90 is connected to the rod and bell crank 92 to null the actuator. Pitch input to the actuator will result in movement of actuator rod 86 which will cause axial movement of plenum 32 and surrounding rotating chamber 58 with respect to stationary shaft 26, the plenum sliding on journal bearings 44 and 46.

Vertical motion of plenum 32 and rotating chamber 58 is transferred to the rotor blade by pitch link 94. The lower end of link 94 is connected to boss 96 on rotating chamber 58 and the upper end of the link is pivotably connected to pitch horn 98 on blade 14. Thus a mechanical collective pitch change for the rotor blades may be effected by the pitch linkage 82 and actuators 84 through vertical movement of plenum 32 and related movement of pitch link 94 and rotor blades 14. Integration of the plenum in the mechanical collective pitch system as a axially slideable element permits simplification of the collective pitch system and avoids unnecessary links and levers and complication of the system.

It should be understood that the invention is not limited to the particular embodiment shown and described herein, but that various changes and modifications may be made without departing from the spirit or scope of this concept as defined by the following claims.

I claim:

1. An aircraft utilizing a circulation control rotor system having a rotor drive shaft with rotor blades connected thereto and stationary means surrounding and supporting said drive shaft, a pneumatic system for supplying compressed air to said rotor blades including air storage means surrounding said rotor drive shaft, said air storage means including a nonrotating chamber surrounding said stationary means and having means permitting axial sliding with respect thereto and a rotatable chamber surrounding said nonrotating chamber and having means permitting rotary movement with respect thereto, said air storage means including means for admitting compressed air to said nonrotating chamber and means for conducting air from said rotatable chamber to said rotor blades, mechanical collective pitch control means connected to said air storage means to impact axial sliding thereto as the result of blade pitch change inputs and means connecting said air storage means to said rotor blades to change blade collective pitch in response to blade pitch change inputs.

2. An aircraft in accordance with claim 1 characterized by air storage means located immediately below the rotational plane of the rotor blades.

3. An aircraft in accordance with claim 1 characterized by means connecting said rotatable chamber to said rotor drive shaft so that said chamber is rotated thereby.

* * * * *